UNITED STATES PATENT OFFICE.

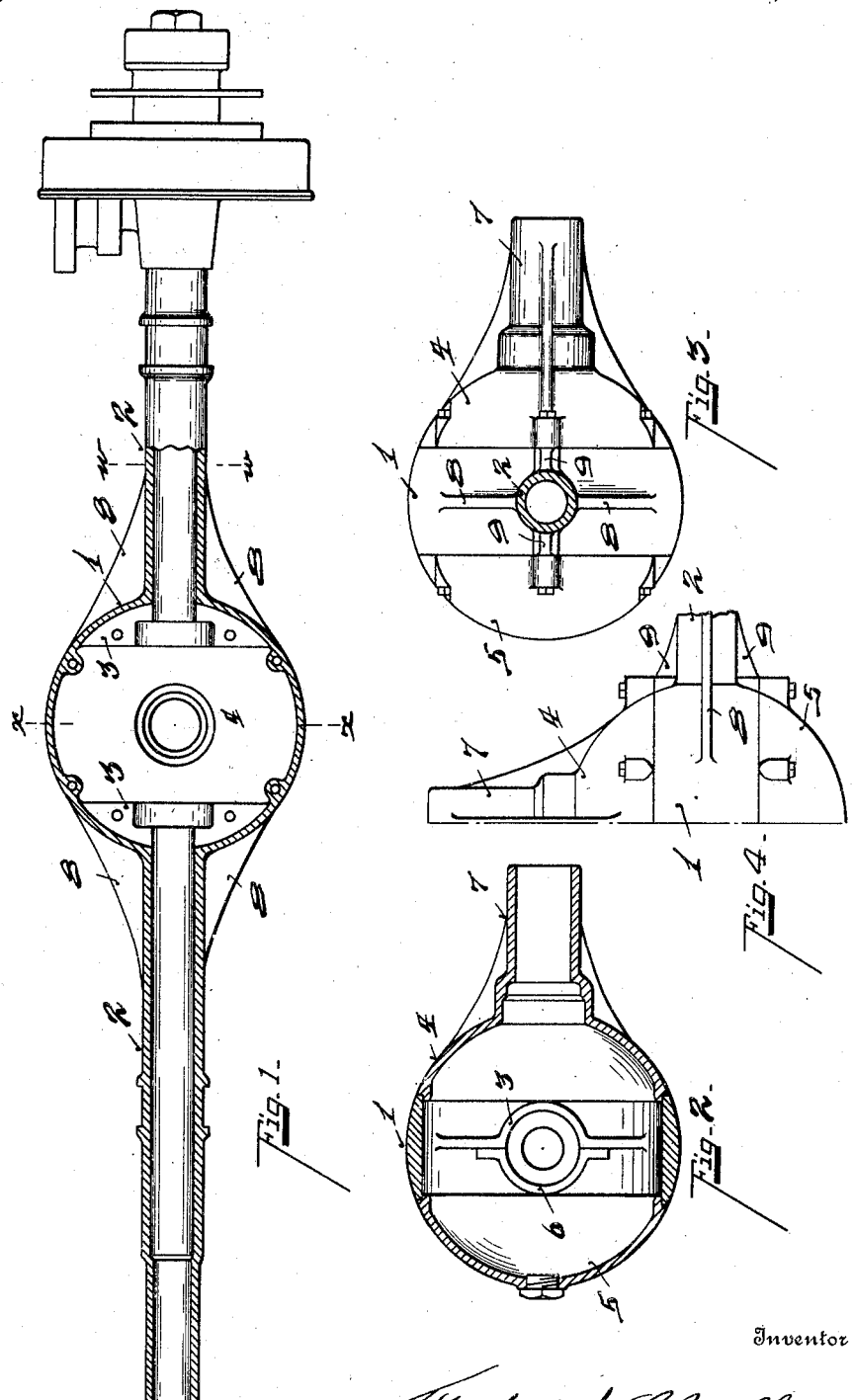

FREDERICK C. MILLER, OF CINCINNATI, OHIO, ASSIGNOR TO NAPOLEON DU BRUL, OF CINCINNATI, OHIO.

REAR AXLE FOR AUTOMOBILES.

1,043,785.  Specification of Letters Patent.  Patented Nov. 5, 1912.

Application filed December 28, 1908. Serial No. 469,524.

*To all whom it may concern:*

Be it known that I, FREDERICK C. MILLER, a citizen of the United States, residing at Cincinnati, in the county of Hamilton and State of Ohio, have invented certain new and useful Improvements in Rear Axles for Automobiles, of which the following is a specification.

My invention relates to an improvement in rear axle construction for automobiles.

One of the objects of my invention is to provide a one-piece axle forming a support for the compensating gears and a partial casing therefor of great strength and rigidity.

Another object of my invention is to provide a one-piece axle in which the bearings for the driving shafts and compensating gears are formed integral with the axle, which bearings likewise serve as a brace for the shell portion of the axle.

The features of the invention are more fully set forth in the description of the accompanying drawings, forming a part of this specification, in which:—

Figure 1 is a central vertical section, partly in elevation, of my rear axle. Fig. 2 is a section on line $x$, $x$, Fig. 1. Fig. 3 is a section on line $w$, $w$, Fig. 1. Fig. 4 is a detailed top plan view of the central portion of the axle, casing cap and rear gear support detachably secured to the axle.

The axle is composed of a one-piece forging having the intermediate shell section 1, constituting a solid gear support and partial casing, and 2 represents the horizontal hollow extensions for the reception of the shafts.

3 represent bearings formed integral with the shell section 1, serving as interior brace supports therefor, and 6 represents a detachable bearing cap adapted to be fixed to the bearings 3.

5 represents a cap detachably secured to the section 1.

4 represents a gear casing and support constructed preferably as a semi-spherical shell secured by bolts to the axle section 1, provided with the tubular extension 7 for receiving the transmission shaft from the front of the vehicle.

8 represents vertical rib extensions formed integral with the axle serving to strengthen the axle at the point of intersection of shell 1 and horizontal sections 2.

9 represents ribs extending horizontally and formed integral with the axle opposite the vertical ribs 8.

By this construction a very rigid gear support is obtained and serving as a partial casing, provides the greatest possible space between itself and the road.

Having described my invention, I claim:—

A one piece axle comprising an intermediate cylindrical casing section having plane vertical sides, oppositely disposed tubular sections extending in a horizontal plane from said casing section, and ribs projecting vertically from the exterior surface of the casing and tube sections at their union and interior of the casing, with the interior casing ribs forming bearings for transmission mechanism mounted within the axle.

In testimony whereof, I have hereunto set my hand.

FREDERICK C. MILLER.

Witnesses:
 OLIVER B. KAISER,
 S. BECK.

Copies of this patent may be obtained for five cents each, by addressing the "Commissioner of Patents, Washington, D. C."